United States Patent
Lee et al.

(10) Patent No.: US 7,143,400 B2
(45) Date of Patent: Nov. 28, 2006

(54) CONFIGURATION DESCRIPTION LANGUAGE VALUE MANAGEMENT METHOD AND SYSTEM

(75) Inventors: Teck Yang Lee, Redwood City, CA (US); Singyun Brian Chu, Mountain View, CA (US); Todd M. Kennedy, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 655 days.

(21) Appl. No.: 10/458,086

(22) Filed: Jun. 9, 2003

(65) Prior Publication Data
US 2005/0034110 A1   Feb. 10, 2005

Related U.S. Application Data

(60) Provisional application No. 60/445,763, filed on Feb. 7, 2003.

(51) Int. Cl.
*G06F 9/45* (2006.01)
(52) U.S. Cl. ...................................................... 717/141
(58) Field of Classification Search ................. 717/141
See application file for complete search history.

(56) References Cited

U.S. PATENT DOCUMENTS

| | | | | |
|---|---|---|---|---|
| 5,696,915 | A * | 12/1997 | Johnston et al. | 715/804 |
| 5,946,489 | A * | 8/1999 | Yellin et al. | 717/147 |
| 6,317,759 | B1 * | 11/2001 | Osmond | 715/513 |
| 6,539,396 | B1 * | 3/2003 | Bowman-Amuah | 707/103 R |

* cited by examiner

*Primary Examiner*—John Chavis
(74) *Attorney, Agent, or Firm*—Martine Penilla & Gencarella, LLP (57) ABSTRACT

A method for managing constant values among disparate code portions that use the same constant names is provided. The method includes inspecting the disparate code portions to identify constant names used in the disparate code portions and defining name value pairs in a text file. The method then includes parsing the text file. The parsing of the text file is configured to generate a definition code file for each of the disparate code portions, and each of the disparate code portions has an associated definition code file, and the associated disparate code portion and definition code file have the same language type. Further, each definition code file defines a same constant value for the same constant names used in each of the disparate code portions.

24 Claims, 5 Drawing Sheets

CONFIGURATION DESCRIPTION LANGUAGE VALUE MANAGEMENT METHOD AND SYSTEM

CROSS REFERENCE TO RELATED APPLICATIONS

This application claims priority from U.S. Provisional Patent Application No. Ser. 60/445,763, filed on Feb. 7, 2003 and entitled "Modularization of Wireless Device Code Components and Custom Design Integration of Java and Non-Java Code Components" by Lee et al., which is incorporated herein by reference in its entirety.

BACKGROUND OF THE INVENTION

1. Field of the Invention

This invention relates generally to programming code structure, and more particularly to method for keeping consistent the use of constants and properties among different code pieces of different source code types, all of which define a single program.

2. Description of the Related Art

Today, embedded mobile devices are being increasingly used by consumers all around the world which has lead to an ever-increasing demand for additional services. To provide such services, embedded mobile device manufacturers have been working with software development firms to code new programs and functionality. However, when firms other than those that make the mobile device program code, the program code type may be different than the code initially defined for the mobile device. Commonly, code that was developed by the mobile phone manufacturer is considered "native code." This native code is usually written in a language such as C or C++. Later, outside firms may write code for the same mobile phone in an anther language, such as Java™.

Platforms and glue code have been developed to handle situations where code of different programming language types is used to make up a single larger program. One problem however, is the management of constants and properties. Many times, a constant defined by one code portion may also be defined by another different type code portion of the same program. Although this is common, errors will occur when the same constant is defined two or more code portions, and the value set in each code portion is different.

One way to solve this problem is to define the constants in one language (e.g., C) and have exposed interfaces to return the values from the other language. This is done so to keep the constant values defined in one location for easy update and maintainability. However this incurs high overheads, during runtime, because some optimizations cannot be done due to "unknown" constant values in the other language (e.g., Java).

Unfortunately, as additional functionality and integrate continues to be worked into multi-type applications, the need to synchronize constant values and properties among program portions will increase. As a result of this integration, more debug time will be wasted detecting problems generated due to wrong use of constant values. In many ways, debugging is sometimes made more complicated because a software tester may not detect the wrong use of a value until many hours are wasted reading and reading the code. Complexity in detecting a bug due to wrong use of a value can in many ways be one of the hardest errors to detect, since for all intensive purposes the code does not appear to have detectable mistakes.

In view of the foregoing, a need therefore exists in the art for a method and system to enable management of constant and property values for programs defined by different programming language type parts, which may share the same value name or property.

SUMMARY OF THE INVENTION

Broadly speaking, the present invention fills this need by providing a method and a system for centralizing the maintenance of name value pairs for defining constants and properties used by different portions of a program, where the different portions are of a different programming language type. It should be appreciated that the present invention can be implemented in numerous ways, including as a process, an apparatus, a system, a device, or a method. Several inventive embodiments of the present invention are described below.

In one embodiment, a method for managing constant values among disparate code portions that use the same constant names is defined. The method includes inspecting the disparate code portions to identify constant names used in the disparate code portions and defining name value pairs in a text file. The method then includes parsing the text file. The parsing of the text file is configured to generate a definition code file for each of the disparate code portions, and each of the disparate code portions has an associated definition code file, and the associated disparate code portion and definition code file have the same language type. Further, each definition code file defines a same constant value for the same constant names used in each of the disparate code portions.

In another embodiment, a method for managing constant values among different code-type portions that use the same constant names. The method includes obtaining the different code-type portions, where each has constant names. The method includes defining name value pairs in a text file. The name value pairs are defined by examining the constant names in the different code-type portions. The method then includes parsing the text file. The parsing of the text file is configured to generate a definition code file for each of the different code-type portions, and each of the different code-type portions has an associated definition code file, and the associated different code-type portion and definition code file has the same language type. In this manner, each definition code file defines a same constant value for the same constant names used in the different code-type portions.

In still another embodiment, a system for managing constant values among disparate code portions that use the same constant names, where the disparate code portions identify constant names is provided. The system includes a text file defining name value pairs. Further includes is at least one code segment for generating a definition code file for each of the disparate code portions, where each of the disparate code portions has an associated definition code file, and the associated disparate code portion and definition code file has the same language type. In this manner, each definition code file defines a same constant value for the same constant names used in each of the disparate code portions.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION

Inventions for methods and systems for centralizing the maintenance of name value pairs for defining constants, and properties used by different portions of a program, where the different portions are of a different programming language type, are provided. Several exemplary embodiments of the invention will now be described in detail with reference to the accompanying drawings.

The embodiments of the present invention provide methods and system for enabling the maintenance and assurance of consistent use of constants among code portions of an application, where the code portions may be of a different programming language type. In general, a configuration description language (CDL) is provided to enable definition of name value pairs.

Name value pairs are those where code names, such as "width" maybe be defined by the value 80 in one code piece, and the same name "width" may be defined by the value 90 in another code piece. In general, the values may be integers or strings, and the value itself will define the type of value. In operation, it is a goal to have both pieces (or all code pieces, practically speaking) defining the same value, say 80. But, as mentioned above, there will be times where the value is not synchronized due to their independent definition by each code piece. In accordance with the invention, the CDL is a text file that can be parsed to enable generation of definition code files for each code piece. If, for example, there is a C code piece and a Java code piece, the CDL will generate a definition code file in C and a definition code file in Java.

The generated definition code files will include the defined name value pair, such that each code type (i.e., the C and the Java code) will have the same value (e.g., 80) for the name (e.g., width). Broadly speaking, the parsing of the CDL will also generate an optional return properties code file. The return properties code file is used to enable external applications (e.g., MIDlets) to access properties from the resulting generated binary code. Accordingly, the CDL enables the consistent use of name value pairs among one or more code pieces. This is especially beneficial when two or more code pieces are of a different type (e.g., different programming language type).

In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

I. Environment Description

As embodiments of the present invention can implement the J2EE, J2ME, or Enterprise JavaBeans (EJB) application, a brief introduction to J2ME, J2EE, and EJB architectures are provided below. The Java 2, Micro Edition (J2ME) platform is a Java platform for consumer and embedded devices such as mobile phones, Personal Digital Assistants (PDAs), TV set-top boxes, in-vehicle telematics systems, and a broad range of embedded devices. Similar to the enterprise (J2EE), desktop (J2SE™) and smart card (Java Card™) counterparts, the J2ME platform is a set of standard Java application program interfaces (APIs) defined through the Java Community Process$^{SM}$ program by expert groups that include leading device manufacturers, software vendors and service providers.

The J2ME platform delivers the power and benefits of Java technology tailored for consumer and embedded devices. The J2ME provides a flexible user interface, robust security model, broad range of built-in network protocols, and support for networked and disconnected applications. J2ME applications are written for a wide range of devices. As such, the J2ME applications can be downloaded dynamically and leverage each native capability of each device. The J2ME platform can be deployed on millions of devices (e.g., mobile phones, PDAs, automotive devices, etc.) supported by leading Java technology tools vendors and used by companies worldwide. Briefly stated, J2ME is the preferable platform for consumer and embedded devices.

The SDK provides software programmers with the speed, security and functionality to create cross-platform, mission critical applications. The JRE provides the execution environment needed to run Java platform-based applets and applications.

The J2ME architecture defines configurations, profiles and optional packages as elements for building complete Java runtime environments that meet the requirements for a broad range of devices and target markets. Each combination is optimized for the memory, processing power, and I/O capabilities of a related category of devices. The result is a common Java platform that fully leverages each type of device to deliver a rich user experience.

Configurations

Configurations are composed of a virtual machine and a minimal set of class libraries. The configurations provide the base functionality for a particular range of devices that share similar characteristics (e.g., network connectivity, memory footprint, etc.). Currently, there are two J2ME configurations: the Connected Limited Device Configuration (CLDC), and the Connected Device Configuration (CDC):

CLDC

CLDC is the smaller of the two configurations, and by way of example, is designed for devices with intermittent network connections, slow processors, and limited memory (e.g., mobile phones, two-way pagers, PDAs, etc.). By way of example, the devices may have either 16- or 32-bit CPUs, and a minimum of 128 KB to 512 KB of memory available for the Java platform implementation and the associated applications.

CDC

CDC is designed for devices having more memory, faster processors, and greater network bandwidth (e.g., TV set-top boxes, residential gateways, in-vehicle telematics systems, high-end PDAs, etc.). CDC includes a full-featured Java virtual machine, and a much larger subset of the J2SE platform than CLDC. As a result, most CDC-targeted devices have 32-bit CPUs and a minimum of 2 MB of memory available for the Java platform and associated applications.

Profiles

In order to provide a complete runtime environment targeted at specific device categories, configurations can be combined with a set of higher level APIs or profiles that further define the application life cycle model, the user interface, and access to device specific properties.

Mobile Information Device Profile

The Mobile Information Device Profile (MIDP) is designed for mobile phones and entry-level PDAs. Broadly speaking, MIDP can be used on any computing device that needs to take advantage of MIDP's functions. MIDP is a set of Java APIs which, together with CLDC, provides a complete J2ME application runtime environment targeted at mobile information devices, such as mobile phones and entry level PDAs. In this manner, MIDP offers the core application functionality required by mobile applications (e.g., the user interface, network connectivity, local data storage, and application management, etc.). Combined with CLDC, MIDP provides a substantially complete Java runtime environment that leverages the capabilities of handheld devices and minimizes both memory and power consumption.

Currently, CLDC, combined with the MIDP is the Java runtime environment for mobile information devices (MIDs) (e.g., phones, entry level PDAs, etc.). MIDP provides the core application functionality required by mobile applications (e.g., the user interface, network connectivity, local data storage, and application life-cycle management packaged as a standardized Java runtime environment and set of Java APIs, etc.).

Foundation Profile

CDC profiles are layered so that profiles can be added as needed to provide application functionality for different types of devices. The Foundation Profile (FP) is the lowest level profile for CDC and provides a network-capable implementation of CDC that can be used for deeply embedded implementations without a user interface. FP can also be combined with Personal Basis Profile and Personal Profile for devices that require a graphical user interface (GUI).

Personal Profile

The Personal Profile (PP) is the CDC profile aimed at devices requiring full GUI or Internet applet support (e.g., high-end PDAs, communicator-type devices, etc.). PP includes the full Java Abstract Window Toolkit (AWT) libraries and offers Web fidelity capable of easily running Web-based applets designed for use in a desktop environment. PP replaces PersonalJava™ technology and provides PersonalJava applications a clear migration path to the J2ME platform.

Personal Basis Profile

The Personal Basis Profile (PBP), is a subset of PP. PBP provides an application environment for network connected devices that support a basic level of graphical presentation or require the use of specialized graphical toolkits for specific applications.Devices (e.g., TV set-top boxes, in-vehicle telematics systems, information kiosks, etc.) Both PP and PBP are layered on top of CDC and FP.

Optional Packages

The J2ME platform can be further extended by combining various optional packages with CLDC, CDC, and their corresponding profiles. In this manner, specific market requirements can be addressed. Furthermore, optional packages can offer standard APIs for using both existing and emerging technologies (e.g., Bluetooth, Web services, wireless messaging, multimedia, database connectivity, etc.). As optional packages are modular, device manufacturers can include the optional packages, as needed, to fully leverage the features of each device.

By way of example, J2ME™ Mobile Media API Reference Implementation Version 1.0 (MMAPI) extends the functionality of the J2ME platform by providing audio, video and other time-based multimedia support to resource-constrained devices. MMAPI allows Java developers to gain access native multimedia services available on a given device.

The reference implementation for MMAPI runs on the CLDC/MIDP profile running on Windows 2000. By way of example, the reference implementation for MMAPI has support for simple tone generation, tone sequencing, audio/video file playback and streaming, interactive MIDI, and audio/video capture. The J2ME MMAPI reference implementation is a source code product provided for porting to various platforms. The MMAPI specification has been developed through the Java Community Process$^{SM}$ (i.e., JSR-135) by an expert group composed of companies representing device manufacturers, wireless operators and software vendors.

As the embodiments of the present invention can also involve using Enterprise Java Beans (EJB)™ in J2EE platform, below are brief descriptions to the J2EE platform and EJBs. The Java™ 2 Enterprise Edition (J2EE™), developed by Sun Microsystems, Inc., is the development and deployment environment for enterprise software applications capable of running on a variety of desktop computers, servers, and other computing devices. J2EE provides architecture for developing, deploying, and executing applications in a distributed-object environment. In one embodiment, the J2EE platform comprises the Java 2 Software Development Kit, Standard Edition (SDK), and Java Runtime Environment (JRE).

J2EE facilitates building Web-based applications. Broadly speaking, J2EE services are performed in the middle tier between the user browser and the databases and legacy information systems. J2EE comprises a specification, reference implementation and a set of testing suites. J2EE further comprises Enterprise JavaBeans (EJB), JavaServer Pages (JSP), Java servlets, and a plurality of interfaces for linking to information resources in the platform.

The J2EE specifications define how applications should be written for the J2EE environment. Thus the specifications provide the contract between the applications and the J2EE platform. However, there exist a class of JAVA applications that require customization of the J2EE platform. These applications generally utilize application specific strategies created by a particular vendor to accomplish specific tasks that are not provided by the general JAVA platform on which the application executes. Examples of this class of JAVA applications include telecommunications applications and services that are deployed within a particular service provider's environment. This class of applications typically requires continuous availability, which means the environment in which the applications operate requires the applications to be available most of the time.

Summarily, EJB architecture promotes the creation of re-usable server-side behaviors or instructions in the Java language, connectors to enable access to existing enterprise systems, and easy-to-deploy program modules. The EJB architecture creates a collaborative architecture to provide services virtually anywhere, and for a wide range of customers and devices, including mobile devices.

The EJB architecture defines a model for the development and deployment of reusable Java server components called EJB components (i.e., EJB beans). As designed, the EJB component is a non-visible server component having methods that provide business logic in a distributed application. In one example, the EJB architecture includes the EJB client and the EJB server. The EJB client is configured to provide the user-interface logic on a client machine and to make calls to remote EJB components on a server. For instance, the EJB client is provided the information as to how to find the EJB server and how to interact with the EJB components.

In one example, the EJB client does not communicate directly with the EJB component. In one aspect, the EJB container provides the client proxy objects that implement the home and remote interfaces of the component. In another instance, the remote interface is configured to define the business methods that can be called by the client. In another embodiment, the client is configured to invoke the methods resulting in the updating of the database. Thus, the EJB beans are reusable components that can be accessed by client programs. The application programmer codes the business logic into the EJBs and deploys them into a J2EE compliant server. In one example, the server complying with the J2EE specification provides the required system-level services, thus allowing the application programmer to concentrate on business logic.

The EJB server (i.e., the EJB application) includes an EJB container, which in one example provides the services required by the EJB component. For instance, the EJB container may be configured to include one of an EJB home interface or EJB Remote interface and EJB beans. In one embodiment, the EJB home interface and the EJB remote interface are defined in the same Java virtual machine. In a different embodiment, the EJB home interface and the EJB remote interface may be defined on different Java virtual machines or separate physical computers.

In one example, the EJB specification defines a container as the environment in which one or more EJB components can be executed. In accordance to one example, the EJB container provides the infrastructure required to run distributed components thus allowing the clients and component developers to focus on programming business logic. Simply stated, the container manages the low-level communications between the clients and the EJB beans. In one example, once an EJB bean is created by a client, the client invokes methods on the EJB bean as if the EJB bean were running in the same virtual machine as the client.

Furthermore, the clients are unaware of activities on the EJB bean, since the container is configured to sit between the clients and the EJB beans. For instance, if an EJB bean is passivated, its remote reference on the client remains intact. Thus, when the client later invokes a method on the remote reference, the container activates the EJB bean to service the request.

The EJB container encapsulates:
  The client runtime and generated sub classes. In one example, this allows the client to execute components on a remote server as if the components were local objects.
  The naming service allows the clients to instantiate components by name. It further allows components to obtain resources (e.g., database connections, etc.) by name.
  The EJB server component dispatcher, which in one example, executes the component's implementation class and provides services such as transaction management, database connection pooling, and instance lifecycle management.

In one example, three types of EJB components can be enumerated.
  Stateful session Beans: A stateful session bean manages complex processes or tasks that require the accumulation of data. They further manage tasks that require more than one method call to complete but are relatively short lived, store session state information in class instance data, and have an affinity between each instance and one client from the time the client creates the instance until it is destroyed by the client or by the server.
  Stateless session Beans: A stateless session bean manages tasks that do not require the keeping of client session data between method calls. Furthermore, the method invocation by a stateless session bean does not depend on data stored by previous method invocations, there is no affinity between a component instance and a particular client, and different instances of the stateless session beans are seemed identical to the client.
  Entity Beans: An entity bean model is a business model that is a real-world object which methods are run on the server machine. When the entity bean method is called, the program's thread stops executing and control is passed to the server. When the method returns from the server, the local thread resumes executing. In one example, the entity beans have the following characteristics: Each instance represents a row in a persistent database relation (e.g., a table, view, etc.); and The bean has a primary key that corresponds to the database relation's key which is represented by a Java data type or class.

Each EJB component further has a transaction attribute configured to determine the manner the instances of the component participate in transactions. As designed, the EJB container provides services which can include transaction and persistence support to the EJB components. As to the transaction support, the EJB container is configured to support transactions. In one example, when the bean is deployed, the EJB container provides the necessary transaction support. In regard to the persistence support, the EJB container is configured to provide support for persistence of the EJB components, which in one embodiment, is defined as the capability of the EJB component to save and retrieve its state. In this manner, the EJB component does not have to be re-created with each use.

In one example, the EJB architecture is a three-tiered architecture in which the clients reside on the first tier, the application server and the components (i.e., EJB beans) reside on the second tier, and the databases reside on the same host as the EJB server. In accordance to one implementation, the EJB server executes methods on a component from the client or another component, retrieves data from databases, and performs other communications. The EJB server further handles the details of transactions, threads, security, database connections, and network communication. Summarily, the EJB clients request business-logic services from EJB beans running on the second-tier. The EJB beans then use the system services provided by the second-tier server to access data from existing systems in the third tier. The EJB beans apply the business rules to the data, and return the results to the clients in the first-tier.

In one example, the client contains the user interface. The business logic is configured to be separate from both the clients and the databases and resides in the same tier (i.e., second tier) as components that analyze data, perform computations, or retrieve information from data sources and processes.

As J2ME, J2EE, and EJBs use the Java™ (hereinafter "Java") programming language, in a like manner, an overview of Java is provided below. In operation, a user of a typical Java based system interacts with an application layer of a system generally written by a third party developer. The application layer generally provides the user interface for the system. A Java module is used to process commands received by the application layer. A Java virtual machine is used as an interpreter to provide portability to Java applications. In general, developers design Java applications as hardware independent software modules, which are executed Java virtual machines. The Java virtual machine layer is developed to operate in conjunction with the native operating system of a particular hardware, which represents the physical hardware on which the system operates or runs. In this manner, Java applications can be ported from one hardware device to another without requiring updating of the application code.

Unlike most programming languages, in which a program is compiled into machine-dependent, executable program code, Java classes are compiled into machine independent byte code class files which are executed by a machine-dependent virtual machine. The virtual machine provides a level of abstraction between the machine independence of the byte code classes and the machine-dependent instruction set of the underlying computer hardware. A class loader is responsible for loading the byte code class files as needed, and an interpreter or just-in-time compiler provides for the transformation of byte codes into machine code.

More specifically, Java is a programming language designed to generate applications that can run on all hardware platforms, small, medium and large, without modification. Developed by Sun, Java has been promoted and geared heavily for the Web, both for public Web sites and Intranets. Generally, Java programs can be called from within HTML documents or launched standalone. When a Java program runs from a Web page, it is called a "Java applet," and when run on a Web server, the application is called a "servlet."

Java is an interpreted language. The source code of a Java program is compiled into an intermediate language called "byte code". The byte code is then converted (interpreted) into machine code at runtime. Upon finding a Java applet, the Web browser invokes a Java interpreter (Java Virtual Machine), which translates the byte code into machine code and runs it. Thus, Java programs are not dependent on any specific hardware and will run in any computer with the Java Virtual Machine software. On the server side, Java programs can also be compiled into machine language for faster performance. However a compiled Java program loses hardware independence as a result.

II. Configuration Description Language Name Value Pair Management

Figure 1:
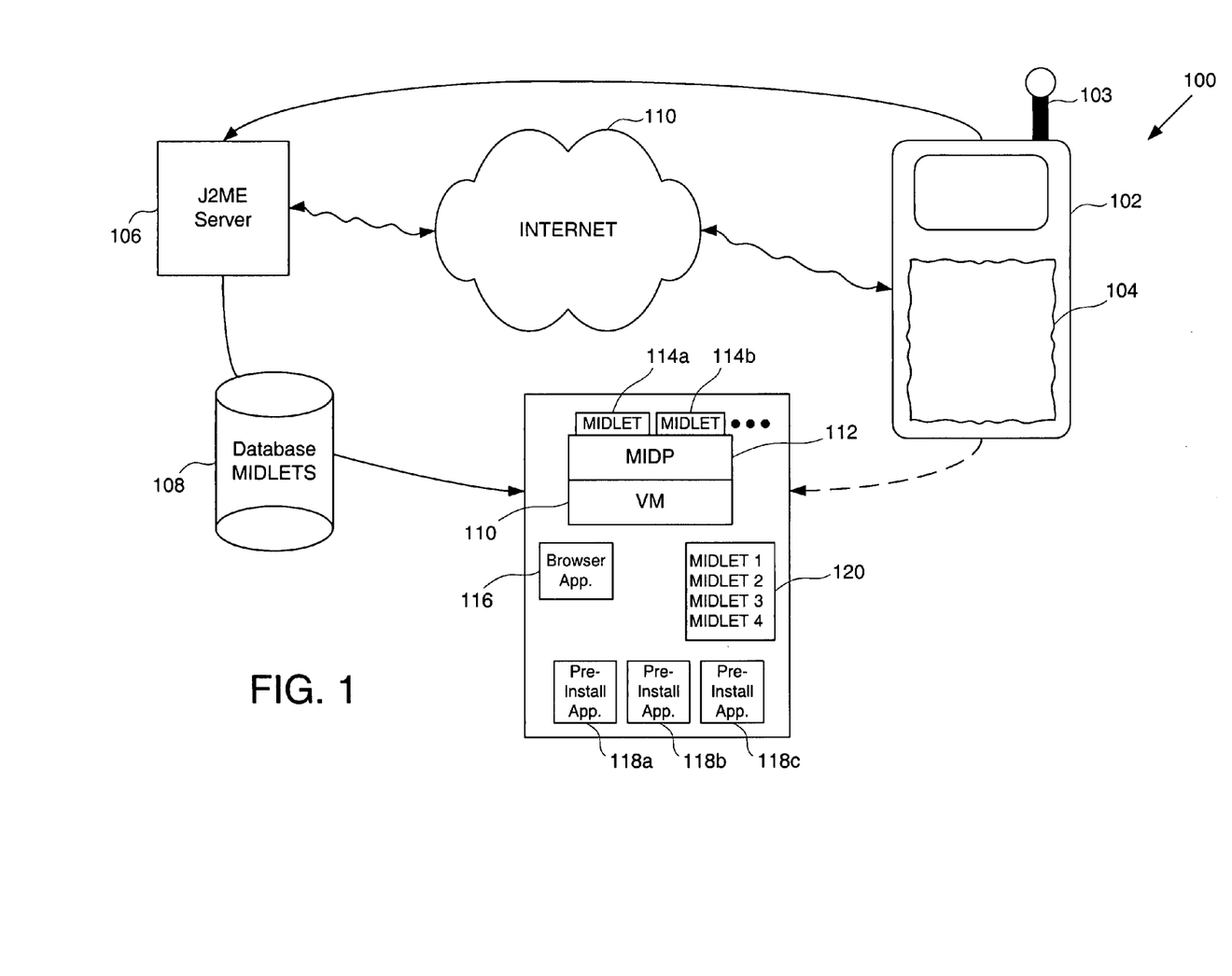
FIG. 1 is a simplified block diagram of an exemplary system depicting the selection of a downloadable application to be installed on an embedded mobile device, in accordance with one embodiment of the present invention.

Keeping the overviews to J2EE, J2ME, EJBs, and Java in mind, reference is made to FIG. 1 showing a simplified block diagram of an exemplary system 100 of an embedded mobile device 102, in accordance with one embodiment of the present invention. The system of FIG. 1 is provided to illustrate one exemplary environment, where code of different types is developed to then define a single binary executable. For this reason, FIG. 1 will be described in respect to a typical environment. The system 100 includes a server 106 in communication with the embedded mobile device 102 via Internet 110. The server 106 is shown to store data in an application repository 108, which in this embodiment is a database. In the example shown in FIG. 1, the server 106 may be a server specifically designed to serve J2ME applications, and includes a plurality of MIDlets (e.g., small applications) stored to the application repository 108.

The illustrated embedded mobile device 102 includes a storage 104. As shown, the storage 104 includes a MIDP 112 that runs on top of a virtual machine (VM) 110. The storage 104 further includes a plurality of MIDlets 114a and 114b that may have been downloaded from the application repository 108 to the storage 104 of the mobile device 102. The storage 104 is shown to further include a browser application 116 and a plurality of pre-installed applications 118a–118d.

As can be seen, the MIDlets 114a and 114b run on top of the MIDP 112 and VM 110. In one embodiment, the VM 110 interoperates using byte code format, a middle level machine instruction that can be translated into native CPU instructions. The VM 110 is configured to execute the byte codes and convert the byte codes into platform dependent machine code.

In one embodiment, the device 102 can browse through the server 106 and the application repository 108 of MIDlets via Internet 110. Initially, the device 102 uses the browser application 116 to dispatch a browse request to the server 106 so as to request a list of all the MIDlets stored to the application repository 108 available to the device 102. At this point, a list 120 of all the MIDlets available to the device 102 stored in the application repository 108 is provided to the device 102. As can be seen, the MIDlet list 120 includes all the MIDlets available to be downloaded to the device 102, which in this example are MIDlet 1, MIDlet 2, MIDlet 3, and MIDlet 4.

In one example, the browser application 116 can be a fixed application configured to discover applications in the server application repository 108. In another instance, the device 102 displays the list 120 using a graphical user interface. In yet another example, the device 102 may receive the list 120 using Wireless Markup Language (WML), HyperText Markup Language (HTML) language, etc. Of course, it must be noted that any suitable communication process will work, so long as the connection and communication is established.

The embodiment of FIG. 1 shows the server 106 in communication with the mobile device 102 via the Internet 110. Generally speaking, the server 106 and the embedded mobile device 102 can communicate using any appropriate communication format (e.g., HyperText Transfer Protocol (HTTP), Linear Network Analysis Package (LNAP), Linear Wireless Application Protocol (LWAP), etc.). Furthermore, the communication link between the Internet 110 and the device 102 or the server 106 can be any appropriate communication link (e.g., Open and modular development environment (EDMA) network, global systems for Mobile Communications (GSM) network, cable connection, etc.). Additionally, as mentioned above, the device 102 and the server 106 can be configured to implement Java programming language.

Figure 2:
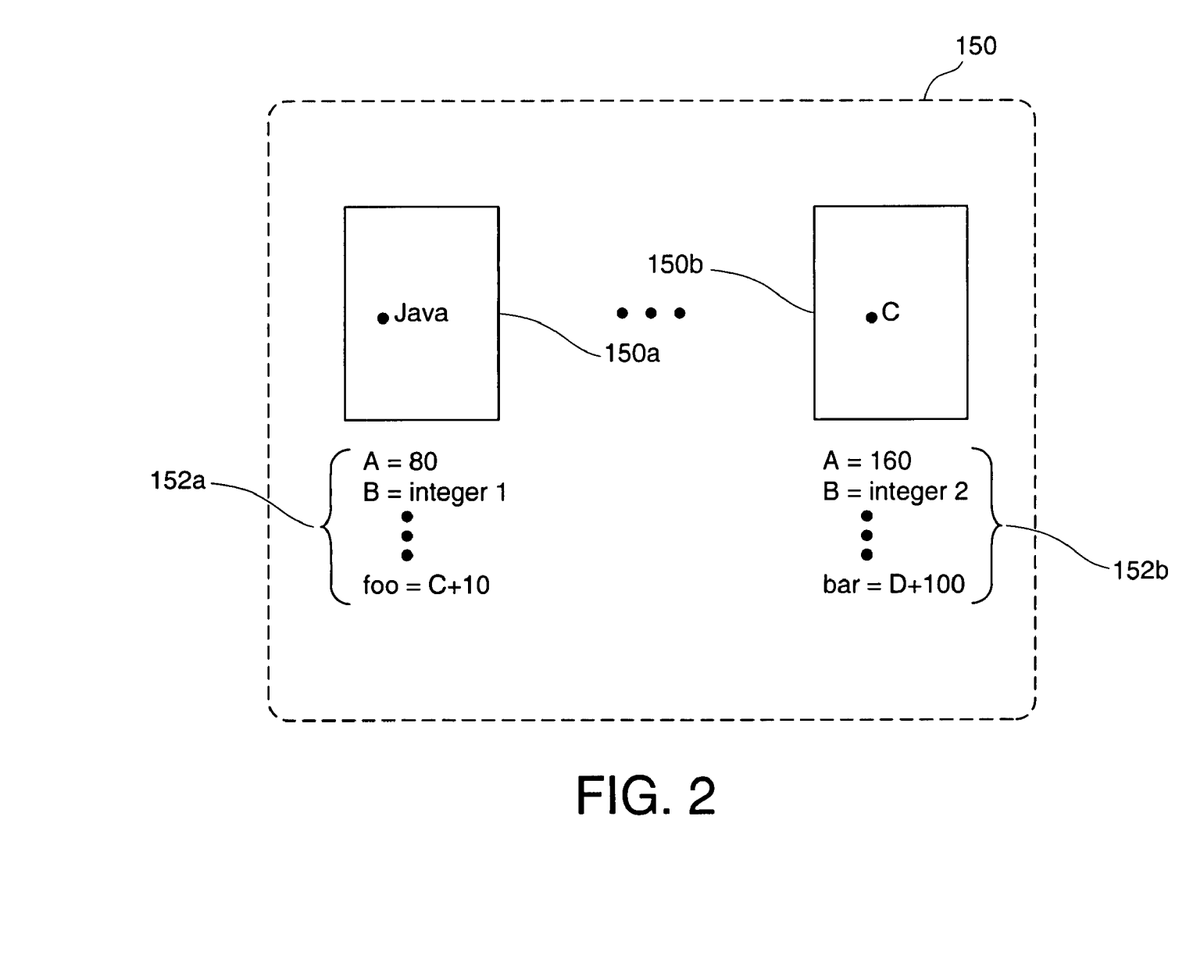
FIG. 2 shows an application having different programming language source code files and associated name values pairs.

FIG. 2 provides a block diagram illustrating a programmed source code 150 having a number of code portions that are of different source code language types (e.g., disparate code-types). As shown, the program source code 150 may include Java code 150a, and C code 150b. As mentioned above, it is common for different code portions to define constants independently of other code portions. Pictorially illustrated, constants 152a may be defined or used by the Java code 150a, while constants 152b may be defined or used by the C code portion 150b.

As shown, the constant values for the Java code 150a may be different than the constant values for the C code 150b at particular times. The scenario will be problematic for the programmed source code 150 when it is compiled and built into an executable binary.

Figure 3:
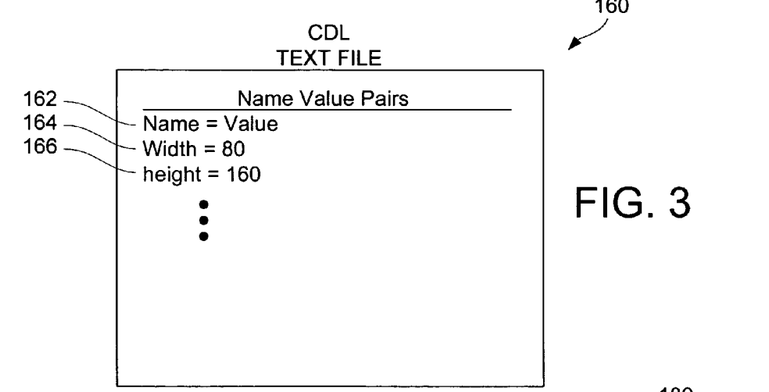
FIG. 3 is an example of a configuration description language text file, in accordance with one embodiment.

In accordance with one embodiment of the present invention, a configuration description language (CDL) text file 160 is provided in FIG. 3. The CDL text file 160 is designed to include a number of name value pairs. The name value pairs will define particular constants and properties that will be part of each of the Java code portion 150a and the C code 150b. To generate the CDL text file 160, the programmed source code 150 will be analyzed to identify what name value pairs are used in the various code portions to generate a uniform name value pairs list that will include all of the constants that may be defined by each of the code portions of a programmed source code 150. As an example, value definitions 162 through 164 may define particular values for particular names, which may be used in each of or both of, the code portions 150a and 150b of FIG. 2.

In the example, the name "width"=80. This name value definition will set with =80 in both the Java code portion 150a and the C code portion 150b as will be explained below. In a similar manner, the height will be set to 160 as shown by the value definition 166. Additional name value pairs will be added to the CDL text file 160 as appropriate. As is well known, a program 150 as shown in FIG. 2, may have numerous pieces of code which may be of different types, and each of the different pieces of code will be analyzed to generate a single name value pair representation of constants and properties used in each of the collection of code portions.

In general, the inventive methods defined herein will enable language-specific constant values to be defined into a common language (configuration description language), and by way of a tool/program enable parsing of the created CDL file. The parsing of the CDL file will enable the generation of language-specific definition files that will be used in conjunction with the programmed source code to generate a binary that will synchronously use identical constant values in each of the code portions (even if they are of disparate code types). Specifically, the CDL text file, once executed, will enable the generation of source code that will synchronize the use of constants between one or more code portions that may define a programmed source code. As a result, if a value width is defined as 80 in one code portion 150a of FIG. 2, that same width will be defined as 80 in code portion 150b, of FIG. 2.

Figure 4:
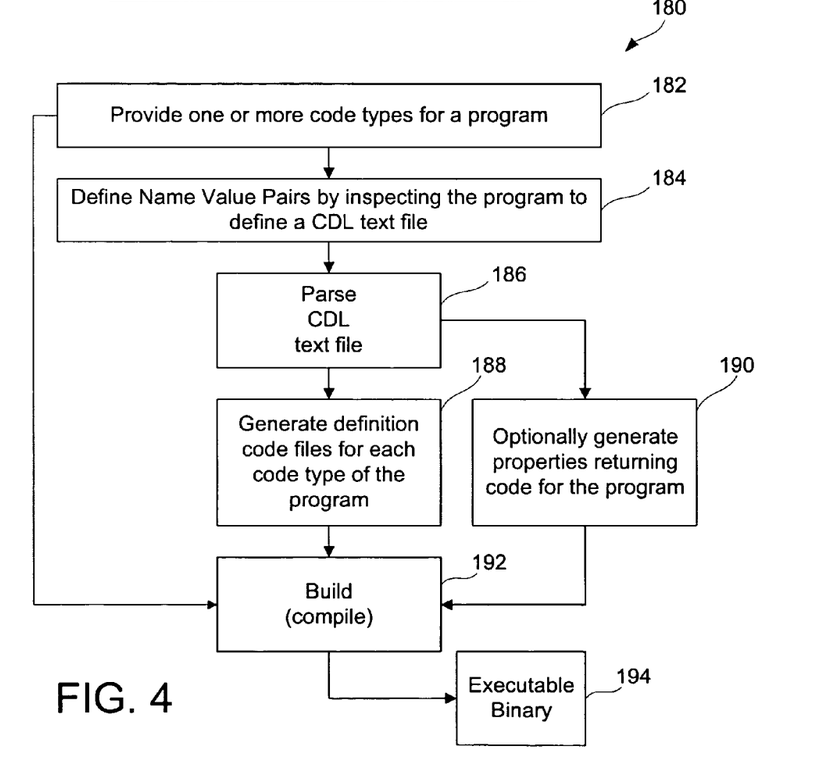
FIG. 4 illustrates a flowchart of a process for maintaining consistent use of constant value pairs and properties between multiple code pieces, in accordance with one embodiment of the present invention.

FIG. 4 illustrates a flowchart diagram of the process for maintaining constants and properties consistently between multiple code portions that may be of different types in a single program, in accordance with one embodiment of the present invention. The method begins at operation 182 where one or more code types are provided for a program. As mentioned with respect to FIG. 2, the program 150 may include many individual pieces of code such as code portions 150a and 150b, and each of those portions may be of different types. As used herein, a different type of program code portion may be one that is written in C language, C++ language, Java, or any other programming language.

Once one or more code types have been provided for a program, the method moves to operation 184 where name value pairs are defined in a CDL text file by inspecting each of the code pieces that form the program. In one embodiment, the programmed portions of different types can be manually inspected by having a human read the source code portions and generate a CDL text file, or can be done automatically by a program that will read the different code portions to then produce a CDL text file.

After the CDL text file has been defined for a particular program having one or more code types, the method moves to operation 186. In operation 186, the CDL text file is parsed. The parsing of the CDL text file will enable the generation of definition code files for each of the code types that make up the program. Therefore, in operation 188, definition code files for each of the code types that make up the program file, are generated. Each of the definition code files will be provided in the form of the same language type as the original portion that define the constants.

In one example, each of the code portions 150a and 150b in FIG. 2 will have a respective definition code file generated in addition to the code portions 150a and 150b. The definition code files, being written in the same language as the portion that defined the constants, will therefore maintain the same type. More importantly, the generated definition code files, which in one embodiment, will include the generation of different language type definition code files, will include the defined constant values identically for each code type.

In a specific example, if the name "width" was set to the value 80 in the Java portion 150a, the name "width" will be set to the value 80 in the generated definition code file that is associated with the C language portion 150b. In addition, an optional generation of a properties returning code may be generated in operation 190. The properties returning code generated by the parsed CDL text file, will be provided as an option to allow other programs (e.g., MIDlets), to communicate with the resulting binary executable to obtain properties at a later time.

Once the CDL text file has been parsed in operation 186 and the definition code files for each code type of the program have been generated, and the properties returning code has been optionally generated in operation 190, those generated code pieces will be provided to the build 192. The build 192 will also be provided with the original one or more code types that define the program as mentioned in 182. At build 192, each of the code portions are compiled to generate an executable binary 194.

At this point, a programmer will be assured that the defined constants and properties in each of the different code types will match in the executable binary 194. That is, even though programs may be defined by a number of different parts and each part may be defined by different types of code (e.g., Java, C, C++, etc.), the resulting executable binary, because of the CDL execution, will ensure that all constants used in every piece of the code, will have the identical value.

Figure 5:
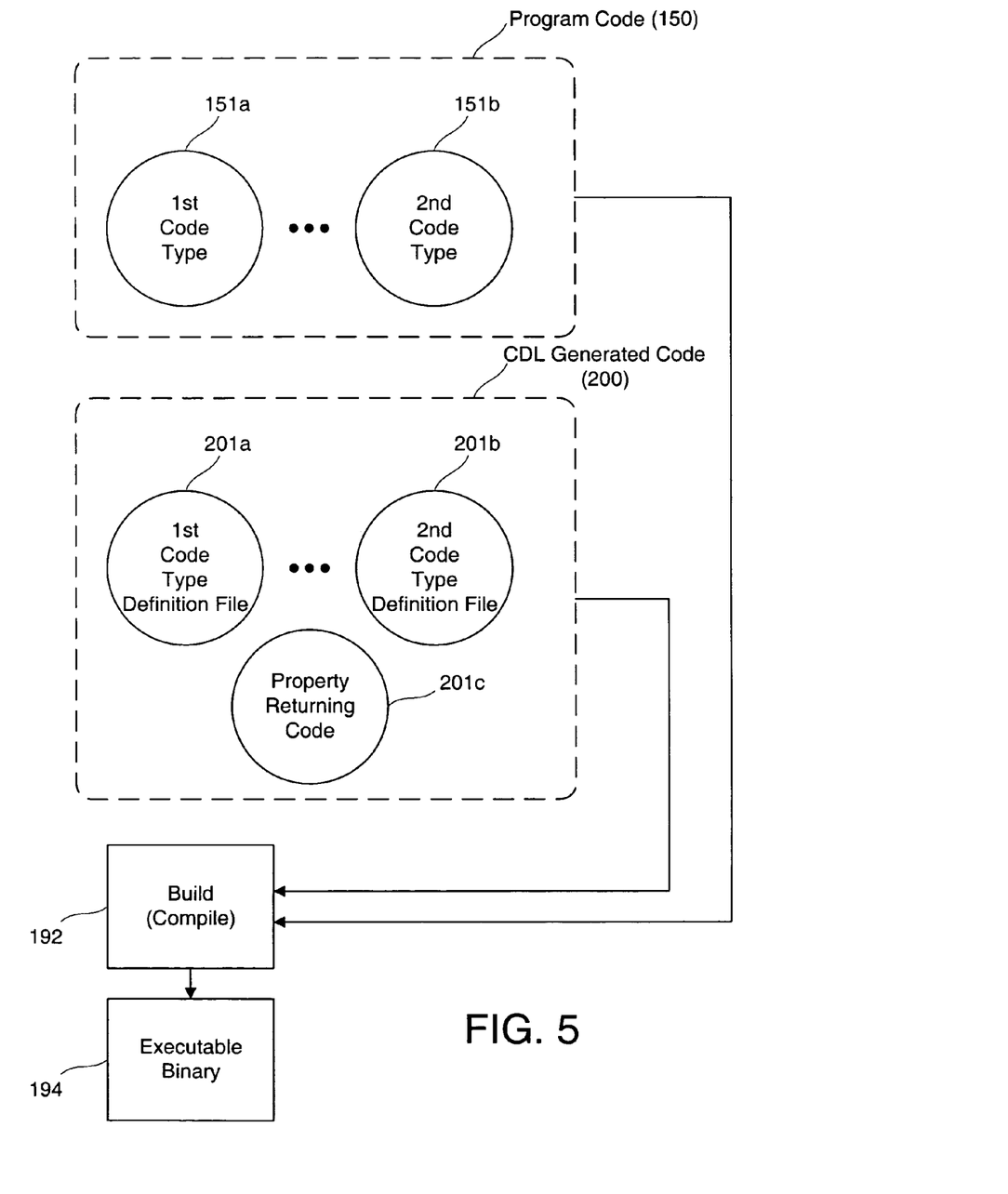
FIG. 5 illustrates a block diagram of the code pieces that get complied, including the code generated by the CDL, in accordance with one embodiment of the present invention.

FIG. 5 illustrates the different pieces of code that are used to generate the build 192. As shown, program code 150 may include a first code type 151a and a second code type, 151b. For purposes of clarity and description, only two pieces of code types are shown in the program 150. However, it should be understood that any number of code types or any number of pieces of code types, may be included as part of the program code 150. The CDL generated code 200 is also shown, which includes a number of code types. Included as part of the CDL generated code 200, is a first code type definition file 201a, and a second code type definition file 201b. Additionally (and optionally), a property returning code piece 201c is provided as part of the generated CDL code 200.

As mentioned above, the first code type 151a is associated with the first code type definition file 201a that was generated by the parsed CDL, and the second code type 151b is associated with the second code type definition file 201b. The definition files in 201a and 201b, will include identical values for the same constants as defined by the CDL text file. Accordingly, if the first code type 151a uses "width" as 80, the first code type definition file 201a will define width as 80. For a second code type 151b, the name value pair of width is also defined as 80 in the second code type definition file 201b.

It should be noted that each of the first code type 151a and the second code type 151b, may not actually define a name value pair, but actually just use the value itself. However, the CDL generated code 200 will provide the actual definition of that value, and the value will be identical for both code type definition files, 201a and 201b. When included, the property returning code 201c will enable outside programs, such as MIDlets, to access properties defined by the CDL generated code.

Accordingly, the programmed code 150 and the CDL generated code 200 will be provided to the build 192, to enable compilation. The compilation will then generate the executable binary 194 as described above.

Figure 6:
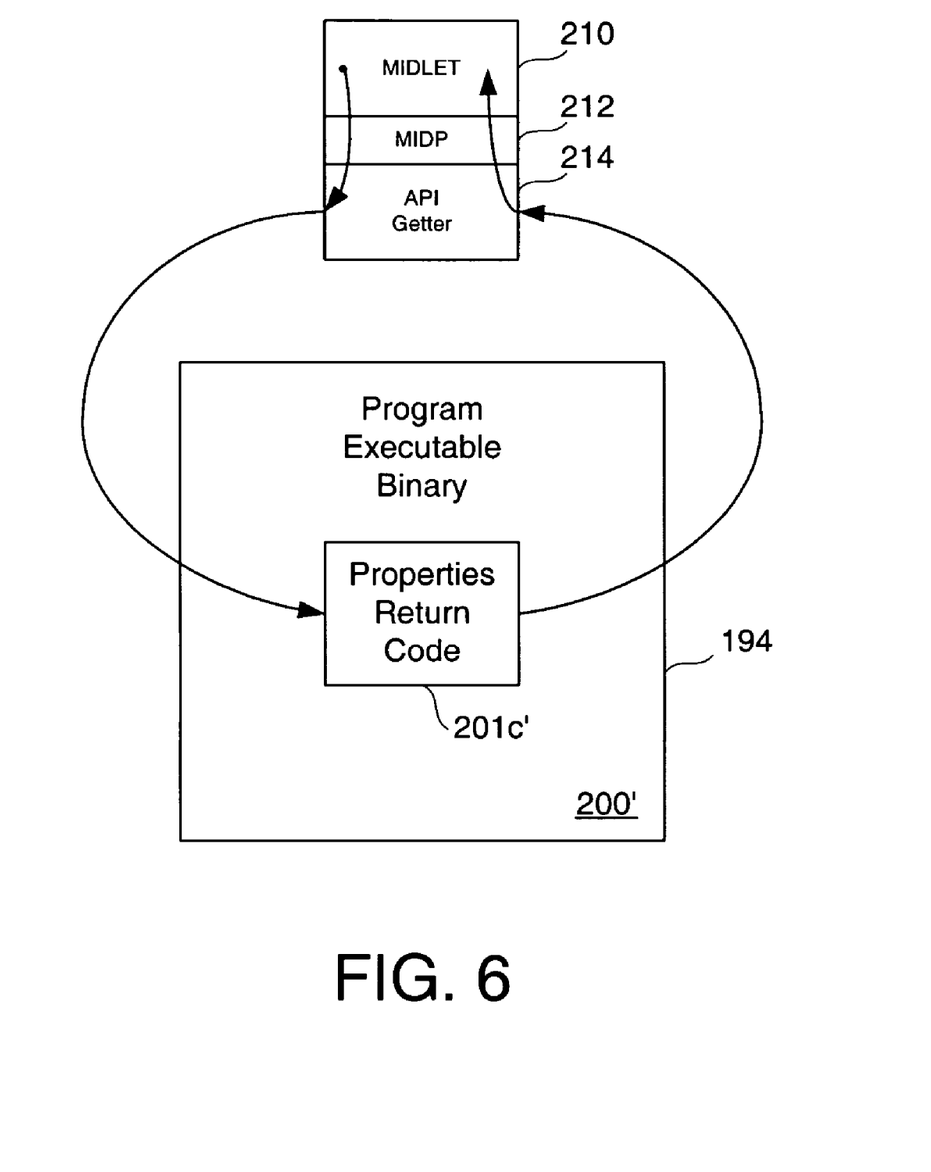
FIG. 6 illustrates a block diagram of the binary code having properties return code for communicating with external applications (e.g., MIDlets), in accordance with one embodiment of the present invention.

FIG. 6 illustrates a block diagram of the executable binary 194 including the properties returning code 201c' in binary form. The programmed executable binary 194 may be in communication with a MIDlet 210. From time to time, MIDlets may request properties from the programmed executable binary 194. To do this, a MIDlet will typically talk to the MIDP 212. The MIDP 212 will communicate through an API getter. As shown, a MIDlet may perform a "sys.get.property". The MIDlet may perform a sys.get.property function that will be passed to the API getter 214 through the MIDP 212. The getter will then communicate with the properties return code 201c'. The properties return code will then respond back to the API getter and return the value to the MIDlet 210.

The MIDlet 210 may be any program that needs to find or determine a particular value of a particular constant, or a property. In some circumstances, the MIDlet will be provided with access to other values and properties, and those values and properties will be divided into public and private data. Public properties and values are those that MIDlets may easily access without restriction to enable processing by the MIDlet itself. Private internal properties and values may not be provided to any MIDlet and may, for example, only used internally by the MIDP 212 (e.g., for security). Accordingly, the properties returning code 201c' may in some circumstances, be required as part of the parsed CDL generated code 200, as shown in FIG. 5. In other circumstances, the property returning code 201c may not be required, depending on the underlying platform.

To achieve maintainability while at the same time ensuring high performance, the embodiments of the invention provides a configuration description language (CDL) and a tool to generate the appropriate language specific files with the declared constant values.

In one embodiment, the invention enables maximum language dependent optimization, while maintaining a consistent constant and property values. A typical J2ME runtime implementation consists of source code in multiple programming languages, such as Java, C, and C++. Some functionality is split between Java and non-Java code. Thus, there is a need to communicate a constant value between the different programming languages. Of course, the method of the invention are not limited to Java, C, or C++.

As an example CDL and the generated definition files follows. In one embodiment, the generated files could use XML as the file format.

```
# Height of the device's screen
com.sun.midp.lcdui.LFDevice.HEIGHT=101
# Width of the device's screen
com.sun.midp.lcdui.LFDevice.WIDTH=101
```

This file will be parsed and a source definition file will be generated either to a Java or C file:

```
package com.sun.midp.lcdui;
class LFDevice {
    static final int HEIGHT = 101;
    static final int WIDTH = 101;
}
LFDevice.h:
    com_sun_midp_lcdui_LFDevice_HEIGHT = 101;
    com_sun_midp_lcdui_LFDevice_WIDTH = 101;
```

The following table A is an example of a .c file that is automatically generated when parsing the CDL.

TABLE A

```
* configuration.c
*
/*
* This file is auto generated by Configurator.
*/
#include <string.h>
#include <ctype.h>
```

TABLE A-continued

```
#include "midpMalloc.h"
#include "configuration.h"
#include "midpStorage.h"
#include "kni.h"
/* Internal function declarations */
static char* UnicodeToCString(jchar* uString, int length);
static char* internalKeys[ ] = {
    "com.sun.midp.io.j2me.sms.Impl",
    "system.i18n.lang",
    "com.sun.midp.io.j2me.sms.DatagramPortIn",
    "com.sun.midp.io.j2me.sms.DatagramHost",
    "system.i18n.encoding",
    "com.sun.midp.io.j2me.sms.CBSPort",
    "wireless.messaging.sms.smsc",
    "com.sun.midp.io.j2me.sms.PhoneNumber",
    "com.sun.midp.io.j2me.sms.DatagramPortOut",
    "com.sun.midp.lcdui.eventHandler",
    "system.display.screen_depth",
    "com.sun.midp.lcdui.inputHandler",
    "system.jam_space",
    "system.display.double_buffered",
    0};
static char* internalValues[ ] = {
    "com.sun.midp.io.j2me.sms.DatagramImpl",
    "en",
    "54321",
    "localhost",
    "ISO8859_1",
    "24680",
    "+17815511212",
    "+5551212",
    "12345",
    "com.sun.midp.lcdui.DefaultEventHandler",
    "8",
    "com.sun.midp.lcdui.DefaultInputMethodHandler",
    "1000000",
    "true",
    0};
static char* systemKeys[ ] = {
    "javax.microedition.io.Connector.protocolpath",
    "microedition.commports",
    "X_SJIS_InternalEncodingName",
    "SHIFT_JIS_InternalEncodingName",
    "microedition.platform",
    "microedition.locale",
    "microedition.profiles",
    "microedition.configuration",
    "video.encodings",
    "video.snapshot.encodings",
    "streamable.contents",
    "microedition.media.version",
    "supports.mixing",
    "supports.audio.capture",
    "supports.video.capture",
    "audio.encodings",
    "supports.recording",
    0};
static char* system Values[ ] = {
    "com.sun.midp.io",
    "0,1",
    "SJIS",
    "SJIS",
    "j2me",
    "en-US",
    "MIDP-2.0",
    "CLDC-1.0",
    "encoding=rgb565 encoding=rgb565&width=160&height=120
encoding=rgb565&width=120&height=160 encoding=rgb565&width=240&height=320
encoding=rgb565&width=480&height=640 encoding=rgb565&width=320&height=240
encoding=rgb565&width=480&height=320",
    "encoding=jpeg",
    "audio/x-wav",
    "1.1",
    "true",
    "true",
```

TABLE A-continued

```
    "true",
    "encoding=pcm",
    "true",
    0};
/*========================================================================
 * FUNCTION:    getSystemProperty( )
 * TYPE:        public operation
 * OVERVIEW:    Return a value of a property key
 * INTERFACE:
 * parameters: key the name of the implementation property.
 * returns:    the string value of the system property
 *             or NULL it there is no property with that key.
 *========================================================================*/
char*
getSystemProp(char* key) {
    int i = 0;
    if (NULL == key) {
        return NULL;
    }
    while (systemKeys[i]) {
        if (strcmp(key, systemKeys[i]) == 0) {
            return systemValues[i];
        }
        i++;
    } /* end of while */
    return NULL;
}
/*========================================================================
 * FUNCTION:    getInternalProperty( )
 * TYPE:        public operation
 * OVERVIEW:    Return a value of a property key.
 * INTERFACE:
 * parameters: key the name of the implementation property.
 * returns:    the string value of the implementation property
 *             or NULL if there is no property with that key.
 *========================================================================*/
char*
getInternalProp(char* key) {
    int i = 0;
    if ((NULL == key) || ('\0' == key[0])) {
        return NULL;
    }
    while (internalKeys[i]) {
        if (strcmp(key, internalKeys[i]) == 0) {
            return internalValues[i];
        }
        i++;
    }
    /* Could not find property in internal list; check system list */
    return getSystemProp(key);
}
/*========================================================================
 * FUNCTION:    getInternalPropDefault( )
 * TYPE:        public operation
 * OVERVIEW:    Return a value of a property key
 * INTERFACE:
 * parameters: key the name of the implementation property.
 *             def the default value for the property if there
 *                 is no property with that key.
 * returns:    the string value of the implementation property
 *             or def if there is no property with that key.
 *========================================================================*/
char*
getInternalPropDefault(char* key, char* defValue) {
    char* value;
    value = getInternalProp(key);
    if (NULL == value) {
        return defValue;
    } else {
        return value;
    }
}
/*========================================================================
```

TABLE A-continued

```
* FUNCTION:      setSystemProp( )
* TYPE:      public operation
* OVERVIEW:      Set the value of a property key
* INTERFACE:
* parameters: key the name of the system property.
*             value the value to associate with the key.
* returns:     <nothing>
*===================================================================*/
void
setSystemProp (char* key , char* value) {
    printf("FIXME: setSystemProp not implemented\n");
}
/*===================================================================
* FUNCTION:      setInternalProp( )
* TYPE:      public operation
* OVERVIEW:      Set the value of a property key
* INTERFACE:
* parameters: key the name of the internal property.
*             value the value to associate with the key.
* returns:     <nothing>
*===================================================================*/
void
setInternalProp (char* key , char* value ) {
    printf("FIXME: setInternalProp not implemented\n");
}
/*===================================================================
* FUNCTION:      finalizeConfig( )
* TYPE:      public operation
* OVERVIEW:      Finalize properties
* INTERFACE:
* parameters: <none>
* returns:     <nothing>
*===================================================================*/
void
finalizeConfig( ) {
    (void)NULL;
}
/*===================================================================
* FUNCTION:      initializeConfig( )
* TYPE:      public operation
* OVERVIEW:      Initialize properties
* INTERFACE:
* returns:     0 on success or != 0 if an error occured during
*              initialization
*===================================================================*/
int
initializeConfig( ) {
    return 0;
}
KNIEXPORT KNI_RETURNTYPE_OBJECT
Java_com_sun_midp_main_Configuration_getProperty0( ) {
    jchar* uStr;
    char* key;
    char* value;
    int strLen;
    KNI_StartHandles(2);
    KNI_DeclareHandle(str);
    KNI_DeclareHandle(result);
    KNI_GetParameterAsObject(1, str);
    strLen = KNI_GetStringLength(str);
    uStr = (jchar*) midpMalloc(strLen * sizeof(jchar));
    if (uStr = = NULL) {
        KNI_ThrowNew("java/lang/OutOfMemoryError", "");
    } else {
        KNI_GetStringRegion(str, 0, strLen, uStr);
        key = UnicodeToCString(uStr, strLen);
        midpFree(uStr);
        /* Look up the property value */
        value = getInternalProp(key);
        midpFree(key);
        if (value != NULL) {
            KNI_NewStringUTF(value, result);
        } else {
            KNI_ReleaseHandle(result);
        }
    }
    KNI_EndHandlesAndReturnObject(result);
}
/*===================================================================
```

TABLE A-continued

```
* FUNCTION: UnicodeToCString( )
* TYPE:       internal operation on string objects
* OVERVIEW: Get the contents of a string object in C/C++ string format.
* INTERFACE:
* parameters: String object pointer
* returns:    char* to the string in C/C++ format
*=====================================================================*/
static char*
UnicodeToCString(jchar* uString, int length) {
    int      i;
    char*    cString;
    if (NULL = = uString) {
        return NULL;
    }
    cString = (char*) midpMalloc((sizeof(char)*length) + 1);
    /* one for the zero terminator */
    if (NULL = = cString) {
        return NULL;
    }
    for (i = 0; i < length; i++) {
        cString[i] = (char)uString[i];
    }
    /* Terminating C-string with zero */
    cString[length] = 0;
    return cString;
}
```

The following table B is an example of a .h file that is automatically generated when parsing the CDL.

TABLE B

```
* configuration.h
*
*
/*
* This file is auto generated by Configurator.
*/
#ifndef ___CONFIGURATION_H
#define ___CONFIGURATION_H
/* External function declarations */
char* getSystemProp(char*);
char* getInternalProp(char*);
char* getInternalPropDefault(char*, char*);
void setSystemProp (char*, char*);
void setInternalProp (char*, char*);
void finalizeConfig( );
int initializeConfig( );
#endif /* ___CONFIGURATION_H */
```

The following table C is an example of a Java file that is automatically generated when parsing the CDL.

TABLE C

```
* Configuration.java
*
/*
* This file is auto generated by Configurator.
*/
package com.sun.midp.main;
/** access the implementation configuration file parameters. */
public class Configuration {
    /** Do not allow this class be instantiated */
    private Configuration( ) {
    }
    /**
     * Gets the implementation property indicated by the specified key.
     *
     * @param    key the name of the implementation property.
     * @return   the string value of the implementation property
     *           or <code>null</code> if there is no property
     *           with that key.
     *
```

TABLE C-continued

```
     * @exception NullPointerException if <code>key</code> is
     *            <code>null</code>.
     * @exception IllegalArgumentException if <code>key</code>
     is empty.
     */
    public static String getProperty(String key) {
        // Implicitly throw NPE if key is null
        if (key.length( ) == 0) {
            throw new IllegalArgumentException("key
            cannot be empty");
        }
        return getProperty0(key);
    }
    /**
     * Gets the implementation property indicated by the specified key or
     * returns the specified default value.
     *
     * @param    key the name of the implementation property.
     * @param    def the default value for the property if there
     *           is no property with that key.
     * @return   the string value of the implementation property
     *           or <code>def</code> if there is no property
     *           with that key.
     * @exception NullPointerException if
                  <code>key</code> is
     *            <code>null</code>.
     * @exception IllegalArgumentException if <code>key</code>
     is empty.
     */
    public static String getPropertyDefault(String key, String def) {
        String result = getProperty0(key);
        return (result != null ? result : def);
    }
    /**
     * Gets the implementation property indicated by the specified key or
     * returns the specified default value as an positive int.
     *
     * @param    key the name of the implementation property.
     * @param    def the default value for the property if there
     *           is no property with that key.
     * @return   the integer value of the implementation property
     *           or <code>def</code> if there is no property
     *           with that key or the value is not a positive
     *           integer (zero is not positive).
     *
```

TABLE C-continued

```
 * @exception NullPointerException if <code>key</code> is
 *             <code>null</code>.
 * @exception IllegalArgumentException if <code>key</code>
 is empty.
 */
 public static int getPositiveIntProperty(String key, int def) {
     int temp = getIntProperty(key, def);
     if (temp > 0) {
         return temp;
     }
     return def;
 }
 /**
  * Gets the implementation property indicated by the specified key or
  * returns the specified default value as an non-zero int.
  *
  * @param      key the name of the implementation property.
  * @param      def the default value for the property if there
  *             is no property with that key.
  * @return     the integer value of the implementation property
  *             or <code>def</code> if there is no property
  *             with that key or the value is not a non-negative
  *             integer.
  * @exception NullPointerException if <code>key</code> is
  *             <code>null</code>.
  * @exception IllegalArgumentException if <code>key</code>
  is empty.
  */
 public static int getNonNegativeIntProperty(String key, int def) {
     int temp = getIntProperty(key, def);
     if (temp >= 0) {
         return temp;
     }
     return def;
 }
 /**
  * Gets the implementation property indicated by the specified key or
  * returns the specified default value as an int.
  *
  * @param      key the name of the implementation property.
  * @param      def the default value for the property if there
  *             is no property with that key.
  * @return     the integer value of the implementation property
  *             or <code>def</code> if there is no property
  *             with that key or the value is not an integer.
  *
  * @exception NullPointerException if <code>key</code> is
  *             <code>null</code>.
  * @exception IllegalArgumentException if <code>key</code>
  is empty.
  */
 public static int getIntProperty(String key, int def) {
     // Implicitly throw NPE if key is null
     if (key.length( ) = = 0) {
         throw new IllegalArgumentException("key
         cannot be empty");
     }
     int val;
     try {
         val = Integer.parseInt(getProperty0(key));
     } catch (NumberFormatException nfe) {
         return def;
     }
     return val;
 }
 private native static String getProperty0(String key);
} /* end of Configuration.java class */
```

Additionally and as mentioned above, the embodiments of the invention are not restricted to constant values. During development, there are property values which can be modified to allow quick changes to aid debugging. However, when the final software is ready to be built, it is not necessary to have this dynamic behavior. Such property value can also be described in the CDL file, and the appropriate code be generated for both development and deployment use. Further, although the CDL file has been described to be a text file, the CDL can be of other types. As an example, the CDL file can also be an XML file, with appropriate mark-up codes.

Although specific reference is made to terminology defined by Sun Microsystems, Inc., it should be understood that any name can be used for such terms, so long as the desired functionality is achieved. The same applies to the underlying environment for the device 102. Device 102 can be any mobile device, and the device can run any operating system. The operating system can support any communication protocol, including protocols for downloading application files. Accordingly, any reference to a particular standard should be viewed only as exemplary and focus should be placed on the claimed functional operation.

With the above embodiments in mind, it should be understood that, the invention may be practiced with other computer system configurations including hand-held devices, microprocessor systems, microprocessor-based or programmable consumer electronics, minicomputers, mainframe computers and the like. Furthermore, the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion. Furthermore, although the present invention implements Java programming language, other programming languages may be used to implement the embodiments of the present invention (e.g., C, $C_{++}$, any object oriented programming language, etc.).

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A computer implemented method for managing constant values among disparate code portions that use the same constant names, comprising: inspecting the disparate code portions to identify constant names used in the disparate code portions; defining name value pairs in a text file; and parsing the text file, the parsing of the text file being configured to generate a definition code file for each of the disparate code portions, each of the disparate code portions having an associated definition code file, and the associated disparate code portion and definition code file having the same language type; wherein each definition code file defines a same constant value for the same constant names used in the disparate code portions.

2. A method for managing constant values among disparate code portions that use the same constant names as recited in claim 1, wherein the parsing of the text file further comprises:
generating a property returning code.

3. A method for managing constant values among disparate code portions that use the same constant names as recited in claim 2, wherein the property returning code enables external applications to access properties of a built binary of the disparate code portions and the definition code files.

4. A method for managing constant values among disparate code portions that use the same constant names as recited in claim 1, further comprising:
compiling the disparate code portions and the definition code files to produce an executable binary.

5. A method for managing constant values among disparate code portions that use the same constant names as recited in claim 2, further comprising:
compiling the disparate code portions, the definition code files, and the property returning code to produce an executable binary.

6. A method for managing constant values among disparate code portions that use the same constant names as recited in claim 1, wherein the disparate code portions are of different programming language types.

7. A method for managing constant values among disparate code portions that use the same constant names as recited in claim 6, wherein the different programming language types include, C, C++, and Java.

8. A method for managing constant values among disparate code portions that use the same constant names as recited in claim 1, wherein the text file is a configuration description language (CDL) file.

9. A computer implemented method for managing constant values among different code-type portions that use the same constant names, comprising: obtaining the different code-type portions, each having constant names; defining name value pairs in a text file, the name value pairs being defined by examining the constant names in the different code-type portions; and parsing the text file, the parsing of the text file being configured to generate a definition code file for each of the different code-type portions, each of the different code-type portions having an associated definition code file, and the associated different code-type portion and definition code file having the same language type; wherein each definition code file defines a same constant value for the same constant names used in the different code-type portions.

10. A method for managing constant values among different code-type portions that use the same constant names as recited in claim 9, wherein the parsing of the text file further comprises:
generating a property returning code.

11. A method for managing constant values among different code-type portions that use the same constant names as recited in claim 10, wherein the property returning code enables external applications to access properties of a built binary of the different code-type portions and the definition code files.

12. A method for managing constant values among different code-type portions that use the same constant names as recited in claim 9, further comprising:
compiling the different code-type portions and the definition code files to produce an executable binary.

13. A method for managing constant values among different code-type portions that use the same constant names as recited in claim 11, further comprising:
compiling the different code-type portions, the definition code files, and the property returning code to produce an executable binary.

14. A method for managing constant values among different code-type portions that use the same constant names as recited in claim 9, wherein the different code-type portions are of different programming language types.

15. A method for managing constant values among different code-type portions that use the same constant names as recited in claim 14, wherein the different programming language types include, C, C++, and Java.

16. A method for managing constant values among different code-type portions that use the same constant names as recited in claim 9, wherein the text file is a configuration description language (CDL) file.

17. A system for managing constant values in a computer readable medium among disparate code portions that use the same constant names, the disparate code portions identify constant names, comprising: means for generating a text file defining name value pairs; and means for generating a code segment for generating a definition code file for each of the disparate code portions, each of the disparate code portions having an associated definition code file, and the associated disparate code portion and definition code file having the same language type; wherein each definition code file defines a same constant value for the same constant names used in each of the disparate code portions.

18. A system for managing constant values among disparate code portions that use the same constant names as recited in claim 17, wherein the text file is further used to produce property returning code.

19. A system for managing constant values among disparate code portions that use the same constant names as recited in claim 18, wherein the property returning code enables external applications to access properties of a built binary of the disparate code portions and the definition code files.

20. A system for managing constant values among disparate code portions that use the same constant names as recited in claim 17, wherein the disparate code portions and the definition code files are transformed into an executable binary.

21. A system for managing constant values among disparate code portions that use the same constant names as recited in claim 18, wherein each of the disparate code portions, the definition code files, and the property returning code is transformed into an executable binary.

22. A system for managing constant values among disparate code portions that use the same constant names as recited in claim 17, wherein the disparate code portions are of different programming language types.

23. A system for managing constant values among disparate code portions that use the same constant names as recited in claim 22, wherein the different programming language types include, C, C++, and Java.

24. A system for managing constant values among disparate code portions that use the same constant names as recited in claim 17, wherein the text file is a configuration description language (CDL) file.

* * * * *